US009245465B1

(12) United States Patent
Geyer et al.

(10) Patent No.: US 9,245,465 B1
(45) Date of Patent: Jan. 26, 2016

(54) SCHOOL BUS STOP SAFETY BREAKAWAY ARM EXTENSION

(71) Applicants: Robert Geyer, Advance, NC (US); William Lanier, Pfafftown, NC (US); J. Ronald Padgett, Lewisville, NC (US); John Canup, Pfafftown, NC (US)

(72) Inventors: Robert Geyer, Advance, NC (US); William Lanier, Pfafftown, NC (US); J. Ronald Padgett, Lewisville, NC (US); John Canup, Pfafftown, NC (US)

(73) Assignee: B.L. Solutions LLC, Lewisville, NC (US)

( * ) Notice: Subject to any disclaimer, the term of this patent is extended or adjusted under 35 U.S.C. 154(b) by 0 days.

(21) Appl. No.: 14/337,557

(22) Filed: Jul. 22, 2014

Related U.S. Application Data

(60) Provisional application No. 62/005,954, filed on May 30, 2014.

(51) Int. Cl.
*B60Q 1/26* (2006.01)
*G09F 21/04* (2006.01)
*B60R 21/34* (2011.01)
*B60R 21/00* (2006.01)

(52) U.S. Cl.
CPC .............. *G09F 21/04* (2013.01); *B60Q 1/2657* (2013.01); *B60Q 1/2692* (2013.01); *B60R 21/34* (2013.01); *B60R 2021/0067* (2013.01); *B60R 2021/346* (2013.01)

(58) Field of Classification Search
CPC ....................................................... B60Q 1/50
USPC ............................... 340/433; 116/39; 40/591
See application file for complete search history.

(56) References Cited

U.S. PATENT DOCUMENTS

| 2,252,529 | A | | 8/1941 | Simpkins et al. | |
|---|---|---|---|---|---|
| 2,384,689 | A | | 9/1945 | Moore | |
| 3,094,683 | A | | 6/1963 | Watkins | |
| 4,557,449 | A | * | 12/1985 | Davidson et al. | 248/160 |
| 4,559,518 | A | * | 12/1985 | Latta, Jr. | 340/433 |
| 4,697,541 | A | * | 10/1987 | Wicker | 116/28 R |
| 4,825,192 | A | | 4/1989 | Wells | |
| 5,038,136 | A | * | 8/1991 | Watson | 340/480 |
| 5,357,239 | A | * | 10/1994 | Lamparter | 340/433 |
| 5,406,251 | A | * | 4/1995 | Leis | 340/433 |
| 5,481,835 | A | * | 1/1996 | Bloom | 52/98 |
| 5,493,269 | A | * | 2/1996 | Durley et al. | 340/433 |
| 5,812,052 | A | * | 9/1998 | Swanger et al. | 340/433 |
| 6,213,047 | B1 | * | 4/2001 | Means et al. | 116/28 R |
| 6,213,526 | B1 | * | 4/2001 | Swanger et al. | 293/117 |
| 6,382,583 | B1 | * | 5/2002 | Hill et al. | 248/548 |
| 6,396,395 | B1 | * | 5/2002 | Zielinski et al. | 340/425.5 |
| 6,532,616 | B1 | * | 3/2003 | Eustache | 15/250.31 |
| 6,556,903 | B2 | * | 4/2003 | Chinigo et al. | 701/33.7 |
| 6,765,481 | B2 | * | 7/2004 | Haigh et al. | 340/433 |
| 6,894,604 | B2 | * | 5/2005 | Phillips et al. | 340/433 |
| 7,370,602 | B2 | * | 5/2008 | Greves | 116/63 P |

(Continued)

*Primary Examiner* — Shin Kim
(74) *Attorney, Agent, or Firm* — Robert W. Pitts

(57) ABSTRACT

An extended school stop sign, which may but need not be retrofitable, and barrier is mounted on a conventional school bus stop sign and extends further into the adjacent lane to reduce instances in which motorists pass a stopped school bus. A first frame is permanently secured to conventional stop sign mechanism. A second breakaway frame or arm is attachable to and detachable from the first frame, and extends beyond the conventional stop sign. If a vehicle strikes the second frame, it separates without significantly damaging the conventional stop sign mechanism. The extension arm can be moved between a retracted and extended position by the same mechanism that opens and closes the conventional stop sign, or with a new mechanism entirely.

19 Claims, 17 Drawing Sheets

Overall View of device

(56) References Cited

U.S. PATENT DOCUMENTS

| | | | |
|---|---|---|---|
| 7,474,201 B2 * | 1/2009 | Swanger | 340/433 |
| 7,791,464 B1 * | 9/2010 | Giddings et al. | 340/472 |
| 8,763,484 B2 | 7/2014 | Vinko, Jr. et al. | |
| 2003/0019999 A1 * | 1/2003 | Hill et al. | 248/548 |

* cited by examiner

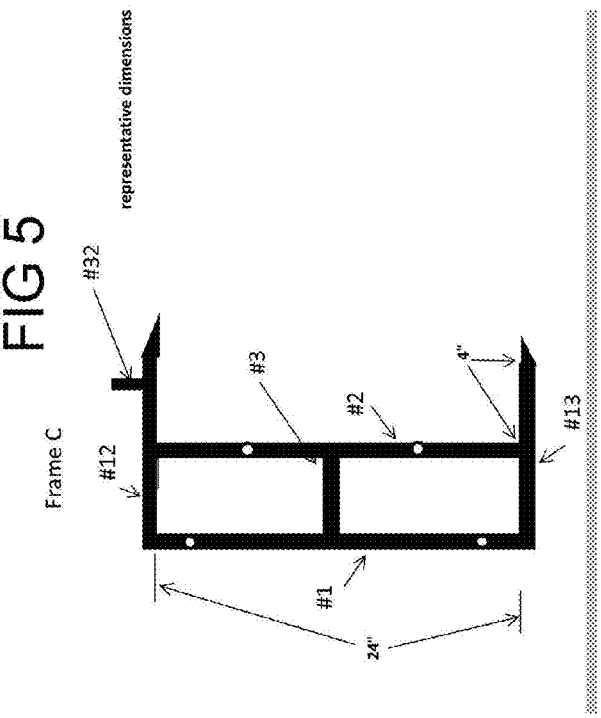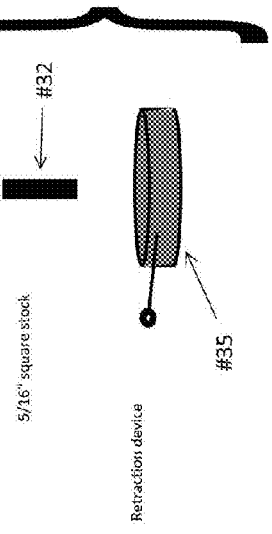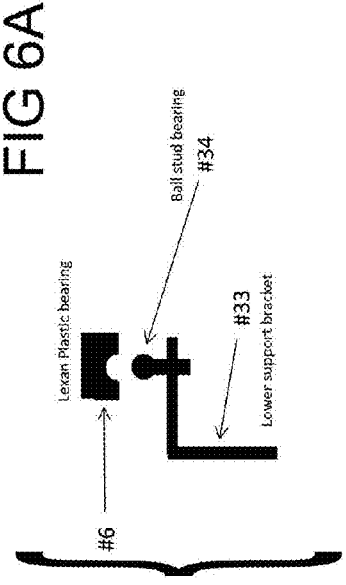

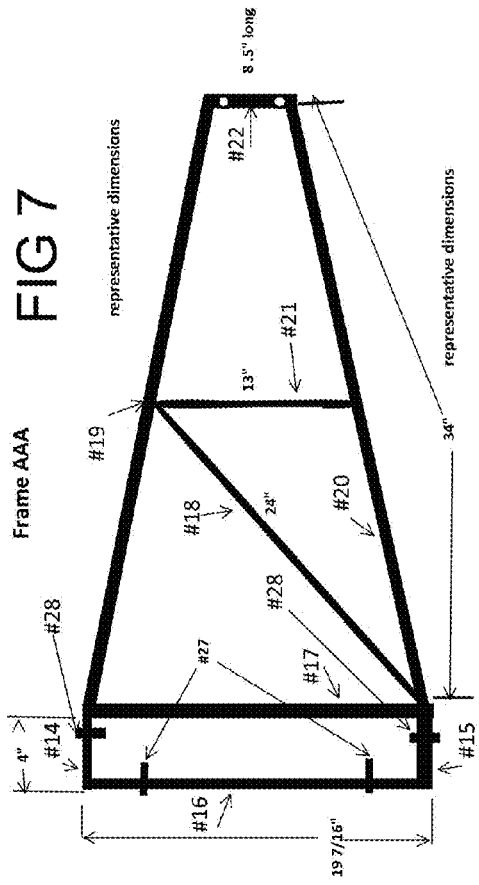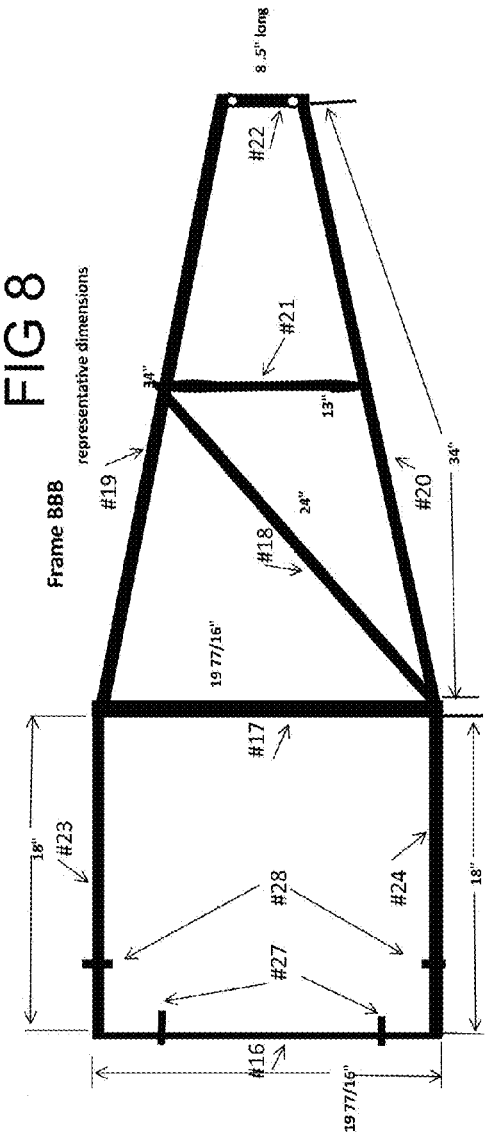

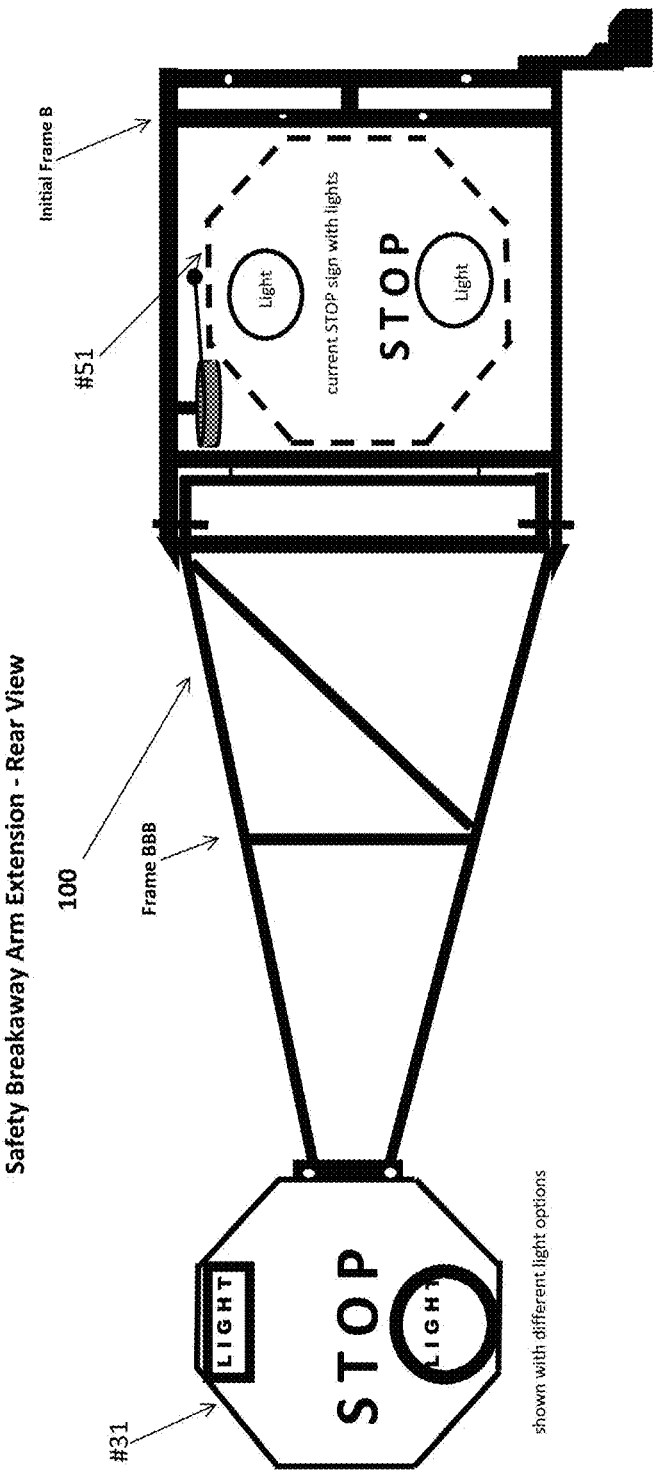

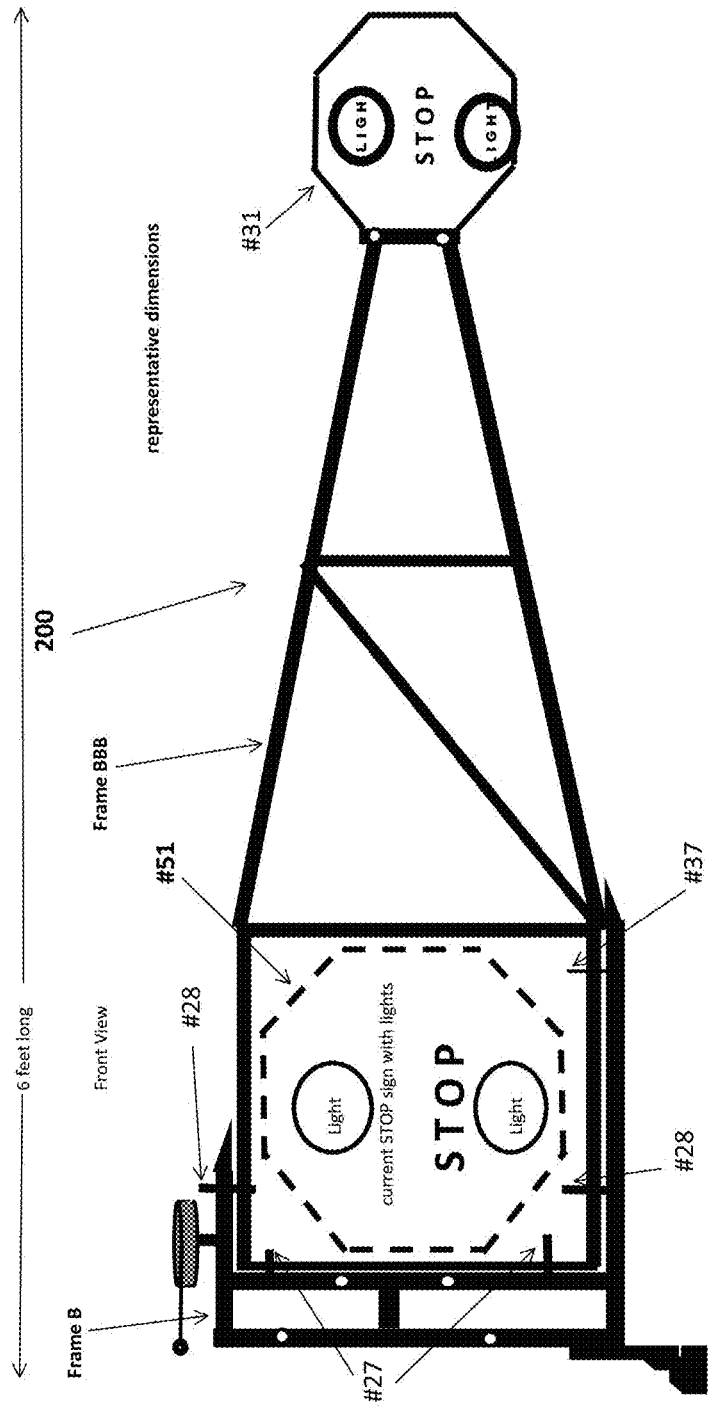

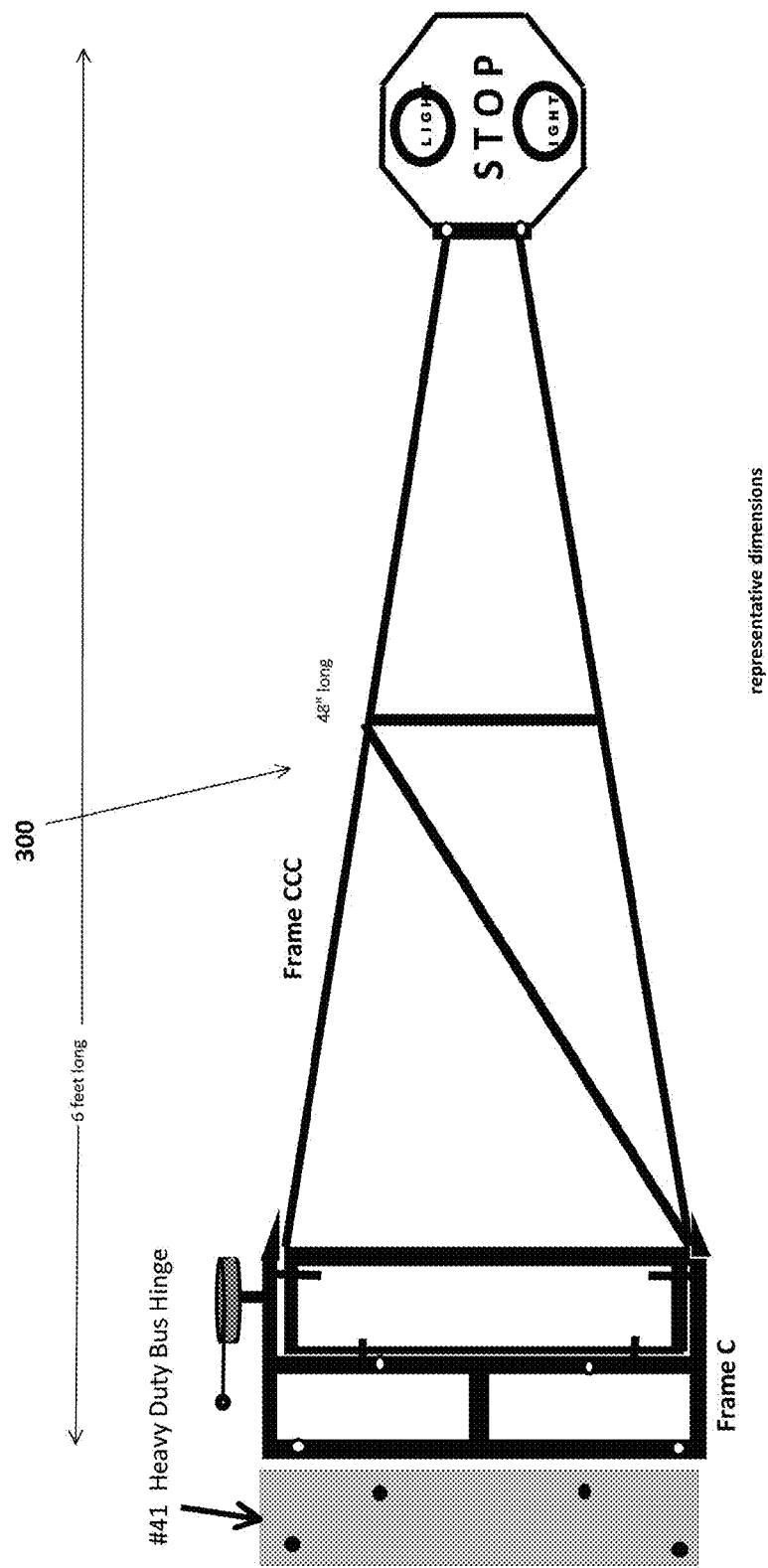
FIG 12 Safety Breakaway Arm Extension - Front View option C

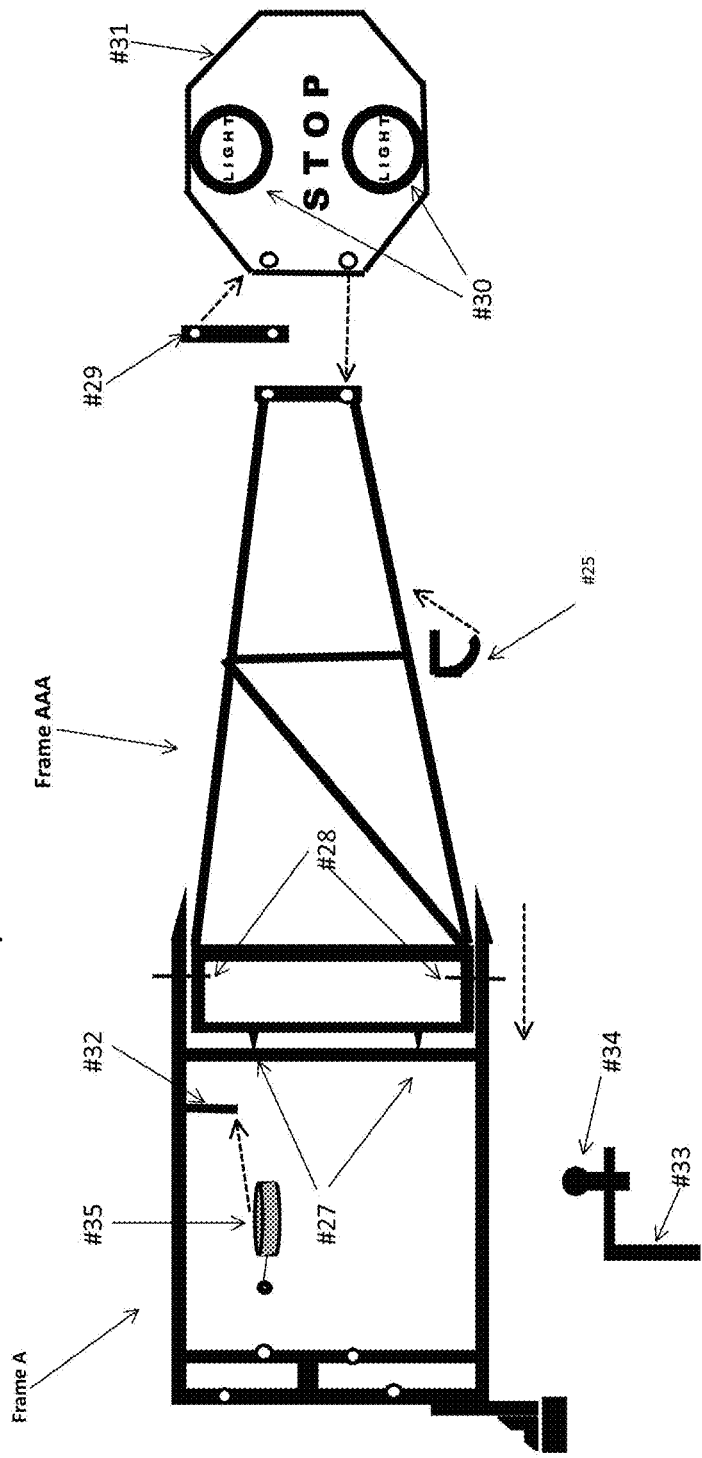

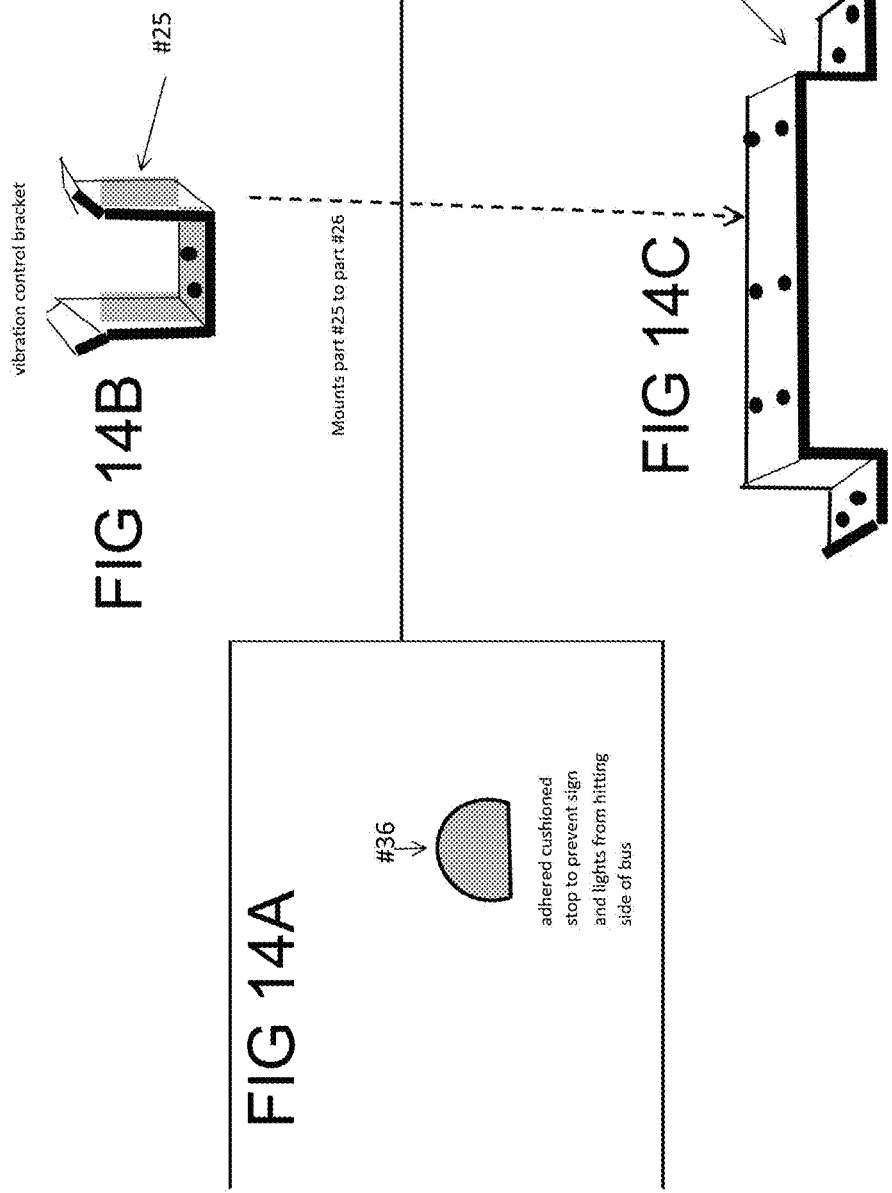

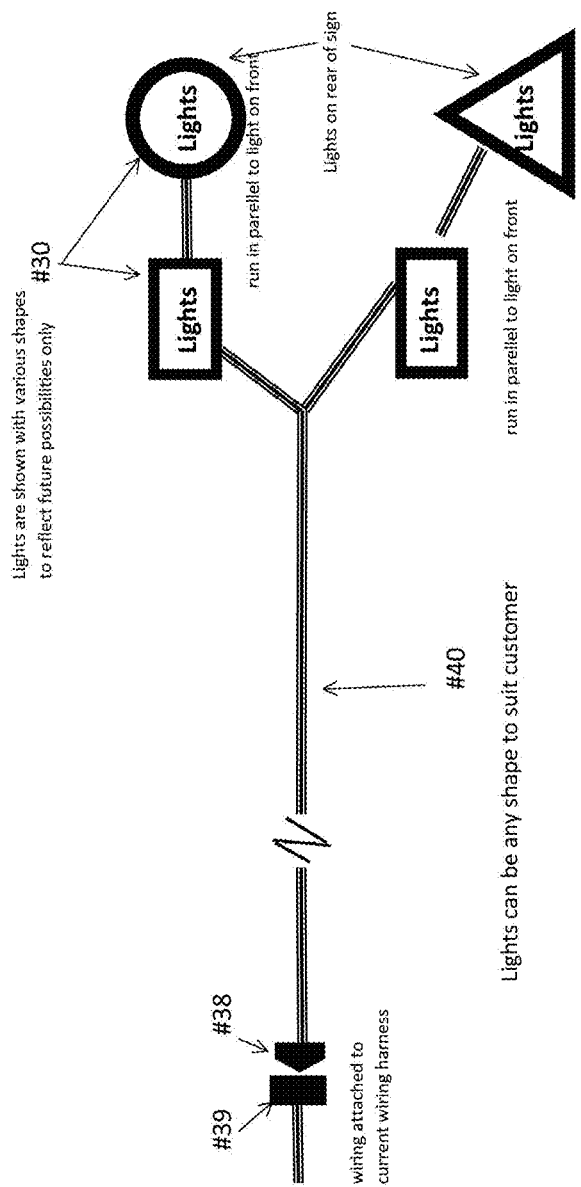

FIG 16A
Parts list for preferred embodiments

| Part # | Part Name | |
|---|---|---|
| A | Supporting Frame A - Option A | 1 |
| AAA | Extension Frame AAA - Option A | 1 |
| B | Supporting Frame B - Option B | 1 |
| BBB | Extension Frame BBB - Option B | 1 |
| C | Supporting Frame A - Option A | 1 |
| CCC | Extension Frame CCC - Option C | 1 |
| 25 | Vibration control piece | 1 |
| 26 | Mounting Bracket for vibration control piece | 1 |
| 27 | Stabilizing Points - stainless 1/4 - 20 | 2 |
| 28 | Shear Members 1/4-20 - Nylon with 1/4" x 20 Nylon Locking nuts | 2 |
| 29 | Cover support plate | 1 |
| 30 | LED Round 10 bulb | 4 |
| 31 | STOP Sign plate - Aluminum Double Sided Reflective 18" | 1 |
| 33 | Lower Support Bracket | 1 |
| 34 | 3/8" ball stud and nut | 1 |
| 35 | 7 lb. retraction device | 1 |
| 36 | Cushioned stop for sign & light protection | 1 |
| 37 | Shear Member Small 8/32 X 1" nylon | 1 |
| 38 | Male 3 wire plug | 1 |
| 39 | Female 3 wire plug | 1 |
| 40 | Wiring harness for Frame AAA | 1 |

FIG 16B

Hardware package

| | |
|---|---|
| Pkg attachment nuts and bolts | 1 |
| Sign Support Bolts – stainless 1/4 – 20 x 1 1/4" with 1/4" x 20 stainless Locking nuts | 1 2 |
| Instruction manual for installation and detailed parts list | |
| Epoxy for non porous surfaces | |
| Normal wiring connectors to bus wire harness | |
| Liquid insulation and electrical tape (for 10) | |
| Locktight or equivelent for bolts | |
| 3/4" reflective red weather resistant tape | |
| 10  3/16" aluminum pop rivets | |

Bus Crossing Guard Safety Breakaway Arm as mounted on a school bus

SCHOOL BUS STOP SAFETY BREAKAWAY ARM EXTENSION

CROSS REFERENCE TO PRIOR APPLICATIONS

This application claims the benefit of prior U.S. Provisional Patent Application 62/005,954 filed May 30, 2014.

BACKGROUND OF INVENTION

1. Field of the Invention

This invention relates generally to an apparatus which extends a STOP sign on the driver's side of a school bus. It is designed to work in conjunction with the existing STOP sign, swinging to an outstretched position to nearly the center to the adjoining lane where the bus is stopped. The Stop Safety Breakaway Arm Extension is an auxiliary device designed to assist other vehicle drivers in becoming aware that the school bus has stopped to load or discharge passengers. The invention works in conjunction with the existing bus STOP sign mechanism, or could work independently thereof.

2. Description of the Prior Art

School buses serve to pick up or discharge children attending a school at various points along a route running through the community in which the school is located. As a safety measure, school buses have for many years been equipped with a stop sign mechanism, either manually or automatically controlled. This mechanism is engaged through a hinged connection that allows the sign to be folded against the body of the bus when the bus is not stopped for passenger entry or egress through a door. The basic requirements are defined in a Society of Automotive Engineers (SAE) J1133. The bus stop sign mechanism acts to swing out the stop sign from its normally retracted position against the side of the bus to an outstretched position, providing a signal alerting drivers of nearby vehicles that children are entering or leaving a bus.

The current octagonal bus STOP sign has a hinge plate mounted on the bus to which the STOP sign is usually mounted with 4 bolts or studs. This hinge plate allows the STOP sign to swing out perpendicular to the side of the bus. U.S. Pat. Nos. 2,384,689 and 3,094,683 are illustrative of manually-operated school bus sign devices, while U.S. Pat. No. 2,252,529 discloses a hydraulically operated school bus sign. There are also motor operated, vacuum operated, air pressure operated school bus signs either deployed manually or automatically when the door is opened. One Prior art hinge is shown in FIG. 17.

One practical drawback of any of these units is that many drivers ignore or do not see them. What is needed is a device or mechanism to work in conjunction with the existing STOP sign to heighten the awareness of other drivers of the bus driver's intention to stop and load or discharge passengers. Currently, the vehicle which they want to stop can continue with no significant warning or repercussions. Thus, a child can either cross into the path of a moving vehicle while entering or exiting from a school bus. The current school bus configuration with STOP sign extended offers little or no protection to the child and no physical deterrent or barrier to the driver approaching the stopped school bus.

A structural drawback to the original art design school bus STOP sign mechanism is that it is not strong enough, nor does it have sufficient quality bearing hinge points to allow for a heavier, stronger arm to extend out without redesigning and providing additional support at both the top and bottom of the arm.

The major drawback to the current stop sign is that it signals to a child that it is now safe to cross a street, when indeed it is not, and a vehicle can readily pass the stopped school bus and hit the child either injuring or killing the individual.

SUMMARY OF INVENTION

The Stop Safety Breakaway Arm Extension according to this addresses these deficiencies. Specifically this device provides a mechanical method for control of traffic which the nearby vehicles will find as a deterrent or barrier to passing a stopped school bus. This should in and of itself reduce significantly the passing of stopped school buses and thus reduce the number of injured and killed children associated with this violation of motor vehicle laws. In response to the previous mentioned situations, the main objective is to prevent injury or death to an individual by providing a relatively low cost traffic control method. This will have the same response time as the original mounted mechanism on the bus, as it is immediately attached to the same bracket as the current sign. The Stop Safety Breakaway Arm Extension is light in weight, easily and quickly installed and will wire into the existing bus stop sign light harness.

One of the main features of the preferred embodiment of this invention is that one can retrofit the existing bus STOP arm mechanism without making any significant changes to the existing mechanism, (only replacing the supporting sign bolts and or nuts). The bus STOP sign is attached with a hinge plate to allow it to swing or rotate out perpendicular to the bus. The original holes or studs for holding the STOP sign are used to hold the new invention in place. Therefore this can be used by all existing school buses, not just new ones as they are replaced. The current mechanisms for moving the current STOP sign are significantly adequate to control this attached invention. Thus no new mechanism is necessary to make this operable. The complete breakaway frame AAA weighs just under 6 pounds as herein configured. The existing system will operate the whole extended arm whether it is manually operated, or operated by hydraulic, air, vacuum, motor or other means. In order to keep the cost down, no redesign of the original mechanism is provided. The arm was designed with light weight material and two additional bearing/support points were added.

According to one aspect of this invention, a deployable sign assembly for use on a school bus is extendable and retractable from a traffic lane adjacent the school bus when stopped, to protect children entering or leaving the school bus. the sign assembly comprises a barrier mountable to swing relative to the school bus between a barrier retracted position and a barrier extended position during deployment of the sign assembly. The barrier will extend into the traffic lane adjacent the school bus when in the barrier extended position by a distance sufficient to obstruct motorists trying to pass the stopped school bus in the adjacent lane when the school bus is stopped. This extended barrier will protect children crossing the traffic lane adjacent the school bus when stopped. The barrier is mountable on the school bus at a height at least equal to the eye line of a motorist in a passenger automobile so as to be readily visible to any approaching motorist. The barrier also includes an illuminated stop sign. The barrier is also releasable if struck by a vehicle passing the stopped school bus in the adjacent lane.

According to another aspect of this invention, a safety arm for use on a school bus will prevent motorists from passing the school bus when stopped and to protect children crossing a road to board or exit the school bus. The safety arm comprises a first frame mountable adjacent a side of the school bus. The first frame is pivotable between a retracted position and an extended position. A second frame can be attached to the first frame so that the second frame extends laterally beyond the first frame with a distal stop sign mounted on a remote end of the second frame. The first frame and the second frame move in unison between the retracted and extended positions. The second frame is releasable from the first frame by an impact only striking the second frame. If the second frame is struck by a vehicle, the first frame remains mounted on the side of the school bus and the second frame is released from the first frame.

A safety breakaway arm extension in accordance with this invention is intended for use with an operable stop sign on a vehicle. The arm extension comprises a first arm member securable for movement with the operable stop sign as the operable stop sign moves between an operable stop sign retracted position and an operable stop sign extended position. A second arm member can be attached to the first arm member, but not to the operable stop sign. The first and second arm members are movable between an arm extension retracted position and an arm extension extended position with movement of the operable stop sign between the operable stop sign retracted position and the operable stop sign extended position. The second arm member extends beyond the operable stop sign in the arm extension extended position and the second arm member can be positioned along one side of the vehicle in the arm extension retracted position. The second arm member has a length sufficient to extend into a traffic lane adjacent the vehicle. The second arm can be released from the first frame by an impact on the second frame, not striking the first frame or the operable stop sign.

BRIEF DESCRIPTION OF DRAWINGS

In order to provide a better understanding of the invention, as well as other objects referred to and further features thereof, reference is made to the following detailed description to be read with the accompanying drawings enclosed.

FIG. 2 is the overall view with the school bus on the left. This school bus configuration with STOP sign extended with the invented Stop Safety Breakaway Arm Extension in place, providing deterrent to the driver approaching the stopped school bus. This shows embodiment A, embodiment B and C are similar.

FIG. 5 is Frame C that supports Breakaway Arm option CCC.

FIG. 6A shows a Lower bracket and ball stud bearing. FIG. 6B shows a retraction device and supporting stud.

FIG. 7 is Breakaway option AAA Safety Arm without the second STOP sign attached.

FIG. 8 is Breakaway option BBB Safety Arm without the second STOP sign attached.

FIG. 10 is a rear view with the arm extended Option A. (embodiment B and C are similar).

FIG. 11 is a front view with the arm extended Option B. (embodiment A and C are similar).

FIG. 12 is a front view of Option C. This shows Frame C with modified support holes, and Frame CCC. This also shows half of the hinge of a more robust system holding the frames without any sign close to the bus.

FIG. 13 shows the complete Stop Safety Breakaway Arm Extension in an exploded viewpoint option A. (options B and C are similar).

FIG. 14A shows an adhered cushioned stop to prevent lights and sign from hitting bus when closed. FIG. 14B shows a vibration support and FIG. 14C shows a mounting bracket.

FIG. 15 a schematic of the electrical features of this safety arm.

FIGS. 16A and its continuation 16B show a representative parts list for embodiment A, B or C.

DETAILED DESCRIPTION OF THE PREFERRED EMBODIMENTS

Figure 17:
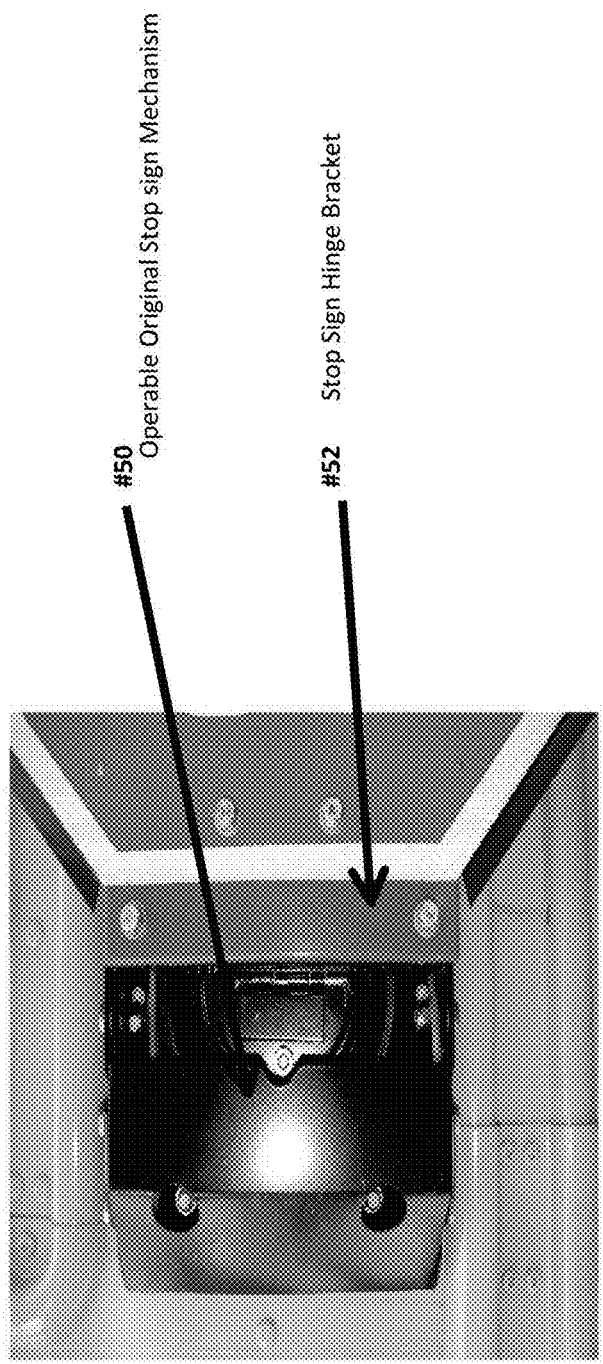
FIG. 17 is a photograph of the original STOP sign mechanism.
Figure 18:
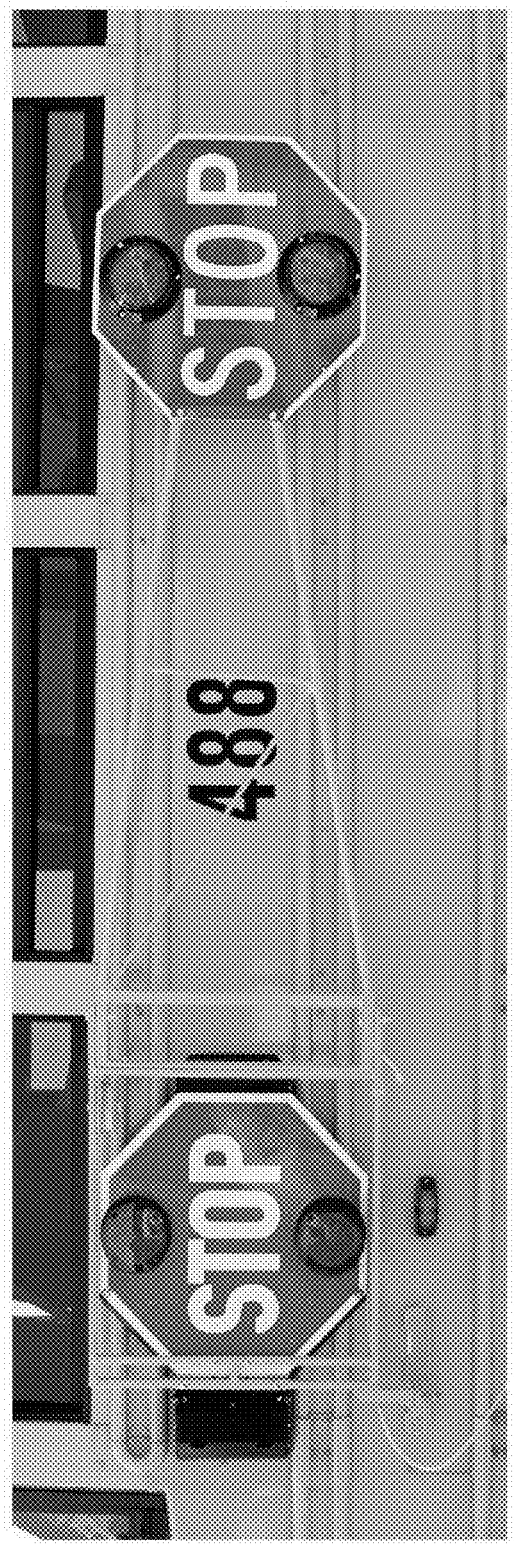
FIG. 18 is a photograph of the complete new invention embodiment A, also showing original sign.

Each embodiment, or option of this extension arm barrier 100, 200, 300 has two main pieces. There is an attachment or mounting section A or B which bolts permanently to the existing STOP sign mechanism 50 comprising a conventional operable sign 51 mounted on a hinge 52 so that the operable sign can be pivoted between a retracted position and an extended position. The third embodiment including a mounting frame C would be mounted on a new hinge 41 and would not be retrofitable to the existing stop sign mechanism. Each extension arm barrier or safety arm 100, 200 and 300 is preferably mounted at the same height as the conventional, pivotal stop sign currently employed on school buses. In each of the three representative embodiments discussed herein, existing holes in the STOP sign mechanism 52, preferably in the existing hinge mechanism, allow attachment of a mounting frame A or B. A breakaway section or extension arm or frame AAA, BBB or CCC respectively is attachable within an outer section of the first mounting frame A, B or C respectively. Stabilizing points 27 as shown in FIG. 7 to act as a hinge point, and shear attachment members 28 as shown in FIG. 17 to secure the breakaway extension arm AAA, BBB or CCC to the respective mounting frame A, B or C. This extension arm or frame AAA, BBB, CCC has an additional sign 31 with lights 30 mounted on a distal end thereof. The stabilized or mounting frame A, B, C is attached to the bus permanently, and breakaway extension arm or frame AAA, BBB, CCC will upon impact will breakaway from the respective mounting frame A, B, C. In case of an accident or deliberate abuse, the shear members 28 will snap off, allowing the extension arm or frame AAA, BBB, CCC to pivot on the pivot points and breakaway from the mounting frame A, B, C disconnecting the electrical circuit connecting the lights 30 to a source of electrical power on the bus and fall to the ground. These together extend breakaway arm or frame AAA, BBB, CCC out nearly into the middle of the next lane, approximately 6 to 7 feet from the side of the bus; at about the same height as the original, operable and pivotal STOP sign 51. Each of the embodiments of the invention has the common element of an extension arm or frame AAA, BBB or CCC on the side of the bus that contains an outer STOP sign 31 and moves in concert with the operable STOP sign 51 and stop sign mechanism 50. This provides a traffic control device for use on school buses which locates the additional traffic control stop sign 31 in the normal field of vision of approaching traffic, yet is robust, and can be extended and retracted automatically and rapidly, and substantially does not suffer wind, acceleration or deceleration damage during movement of the school bus. In the preferred embodiment of this device an additional STOP sign 31 with flashing lights 30 will be in the line of sight of an approaching driver and will extend to the middle of the lane which the vehicle would pass the bus from while either approaching or overtaking from the rear of the bus. The extendable arm AAA, BBB or CCC will also form a barrier between the approaching motorist and motor vehicle and children crossing a street to board or leave the school bus.

Each embodiment of the safety barrier 100, 200, 300 will attach to the existing stop sign apparatus hinge bracket 52, or alternatively to a new hinge 41, and swing into the path of the vehicle with a flashing stop sign 31 nearly midpoint to the lane in which the traffic is coming. This will provide a physical deterrent to a vehicle passing the stopped school bus. There will then be two flashing stop signs 31 and 51 and a physical barrier, which must be ignored or avoided when a driver attempts to pass the stopped school bus.

Although a vehicle could still pass the school bus and hit a child or individual, it could incur an accident with the extended arm AAA, BBB or CCC of the school bus as a result. From an engineering point of view, any device designed to improve safety, should never become a hazard in and of itself. In order to limit damage to the mechanism operating the extension arm AAA, BBB, CCC or to the vehicle hitting the Stop Safety Breakaway Arm Extension sign and barrier 100, 200, 300, a breakaway point has been designed, which will enable the bus to continue even after a vehicular accident with the extended barrier 100, 200 or 300. The original sign 51 should still operate and flash normally. The Stop Safety Breakaway Extension Arm or barrier AAA, BBB or CCC will breakaway in the event that it is struck by a passing vehicle This breakoff point includes an electrical disconnect 38. This extension arm AAA, BBB, CCC will also break away from the respective mounting frame A, B or C if forcibly moved relative to the operable stop sign mechanism 50.

Budgetary issues, especially local school funding will always be an issue. As a result this invention provides a bus stop sign extension apparatus of simple, efficient and reliable design whereby it may be installed at a relatively low cost to the school system. To mount the first embodiment of this device 100, for example, one would remove four bolts or nuts holding the existing STOP sign 51, and replace these bolts with four longer bolts or appropriate nuts to hold the mounting frame A and the original, operable STOP sign 51. Then the extension arm AAA is placed within the supporting mounting frame A and secured with the shear pins or frangible attachment members 28. With the entire device attached the wiring harness 40, carried by the extension arm AAA is connected to the bus electrical system powering the lights on the original operable stop sign 51.

Three additional items are needed for installation. A lower bearing support bracket 33 is mounted in line with the existing bearing point of the original hinge 52. A retraction cable is attached at approximately eight inches towards the rear of the bus from the hinge point but in line with the top of the retraction device. A vibration bracket 25 will be attached at the appropriate height along the side of the bus at approximately four inches from the new retracted stop sign 31. Should an accident occur, and a breakaway happen, only the extension arm AAA, BBB or CCC of the device will need to be replaced. The original mounting frame A, B or C attached to the Bus STOP sign mechanism 50 will remain. This should save substantial time and funds in maintenance of the device.

Succinctly stated the extended arm AAA, BBB, CCC will swing out to an outstretched position when the original STOP sign mechanism 50 is activated and begins flashing its' lights providing a second STOP sign 31 and additional flashing lights 30. When retracted by the mechanism the entire barrier 100, 200, 300 will close against the side of the bus. The safety shear members 28 as shown in FIG. 13 provide a weakening part of the structure, snapping off with impact, while having great tensile strength. The stabilizing points 27 shown in FIG. 13 provide a solid, yet flexible hinge point without additional attachment.

This additional STOP sign 31 with flashing lights 30 provides a significant deterrent to other vehicles not to pass the bus during passenger entry or egress.

Three representative embodiments of this invention, and their component parts will now be described in more detail. It should be understood that this precise description of the assembly, the subassembly and the individual components is merely intended to comprise a description of each functional, but representative embodiment. Therefore the detailed information is representative only and the invention is not confined or restricted by this precise description. One of ordinary skill in the art would understand that there are numerous modifications that could be made without departing from the scope and spirit of the broader invention illustrated by this detailed representative description. Furthermore it should be understood that other modifications could be made. As an illustrative example, the metal frame construction might be replaced by the use of a one-piece extruded plastic frame, carbon fiber, or some or all of the frame components could be replaced with individual plastic or other material components. Another illustration of an alternative component could be the substitution of a spring loaded plunger, received in a detent for the shear pins 28 described herein. Even though the following details are in most, if not all respects non-limiting with respect to this invention, nevertheless this detailed description is believed to instructive.

The following is a description of each item or part used in this invention. In every case the use of types of material, size, weight, manner of connection, fasteners used, only reflect one representative alternative, and are not intended to be the only possibility.

A first attachment or mounting frame A can be fabricated of square steel tubing. Upper and lower horizontal tubing 7 and 8 are of equal in length and are made of ½" square steel tubing. Each tubing section 7 and 8 is of sufficient length to ensure accommodation of the original STOP sign 51 plus have approximately four inches remaining beyond the surrounding square for support of the breakaway frame AAA. Both tubing members 7 and 8 have a hole drilled into it for the shear member 28, which in this application currently is a nylon bolt. The distance along these frame sections 7 and 8 at which a hole is drilled is sufficient to provide a lever or moment arm which will result in development of a force of not less than forty pounds so that each shear member will be broken by only by a force of at least that magnitude. It is understood that the maximum wind resistance that would be encountered during normal and anticipated operation of a school bus or similar vehicle will result in application of a force of approximately fifteen pounds on each shear member 28._In this embodiment, the center of this hole is three inches from the outside of the corner of the frame. The tubing sections 7 and 8 have tapered ends primarily for cosmetic purposes. In addition tubing section 7 has a quarter inch hole drilled eighteen inches from the square end to accept a stud 32 on the retraction device 35 stud as shown in FIG. 6.

Vertical frame members 1, 2 and 9 are preferably identical are made of half inch square steel tubing and have a length sufficient to provide visual clearance to the enclosed original STOP sign. Frame members 1 and 2 have holes of an adequate size and placement to meet the bus bracket specifications, and the location of these holes can be modified for use on buses or vehicles having different structures. There are two additional 9/64" holes drilled on the outside of frame member 9 to accommodate stabilizing pins 27. These holes are oversize relative to the pins allowing for an easier release in case of accident, thus encouraging the breakaway action. The holes are drilled in exacting placement to match up with the stabilizing pins 27 in frame AAA, referred to in FIG. 7.

Center tubing section 3 is preferably made of half inch square steel tubing and of a length to accommodate the correct spacing of the holes in vertical sections 1 and 2 and is located at the midpoint to section 1.

Support tubing member 4 is made of ¾" square steel tubing at least four inches long, and is tapered at one end, primarily for cosmetic purposes. Support member 4 supports bearing angle iron 5 which is fabricated from ¾" steel angle iron and can be two inches long. Support 5 in turn supports ball stud bearing 6.

Ball stud bearing 6 is made of ½" thick Lexan 1½" by 2", or other suitable bearing material with a ⅜" spherical indentation, as shown in FIG. 6, to accept the ⅜" ball stud part 34 as shown in FIG. 6.

Figure 1:
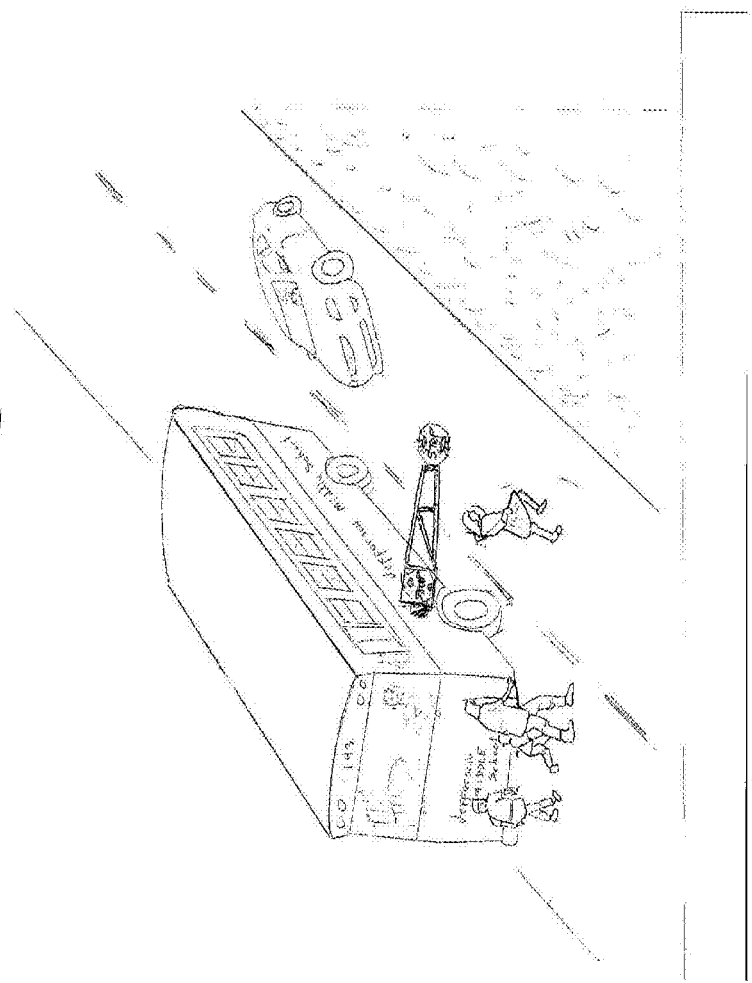
FIG. 1 shows a conception of the arm extended when children would be crossing and a vehicle being blocked by the safety arm invention.
Figure 2:
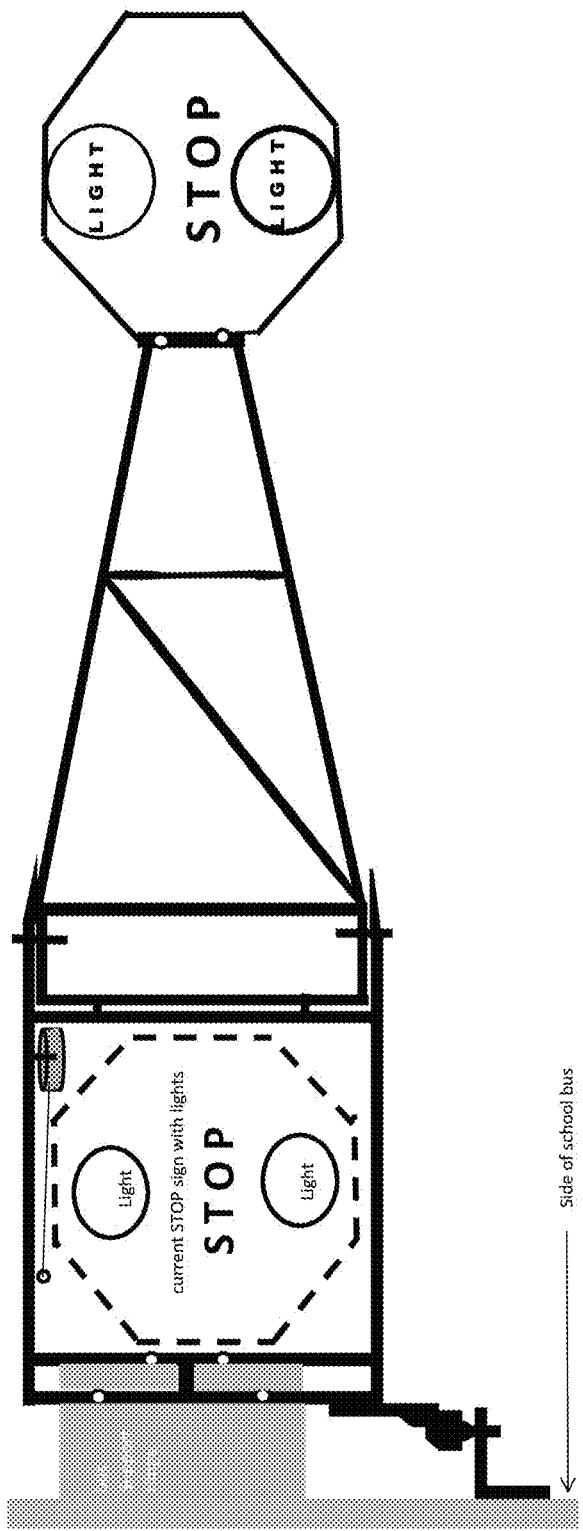
Figure 3:
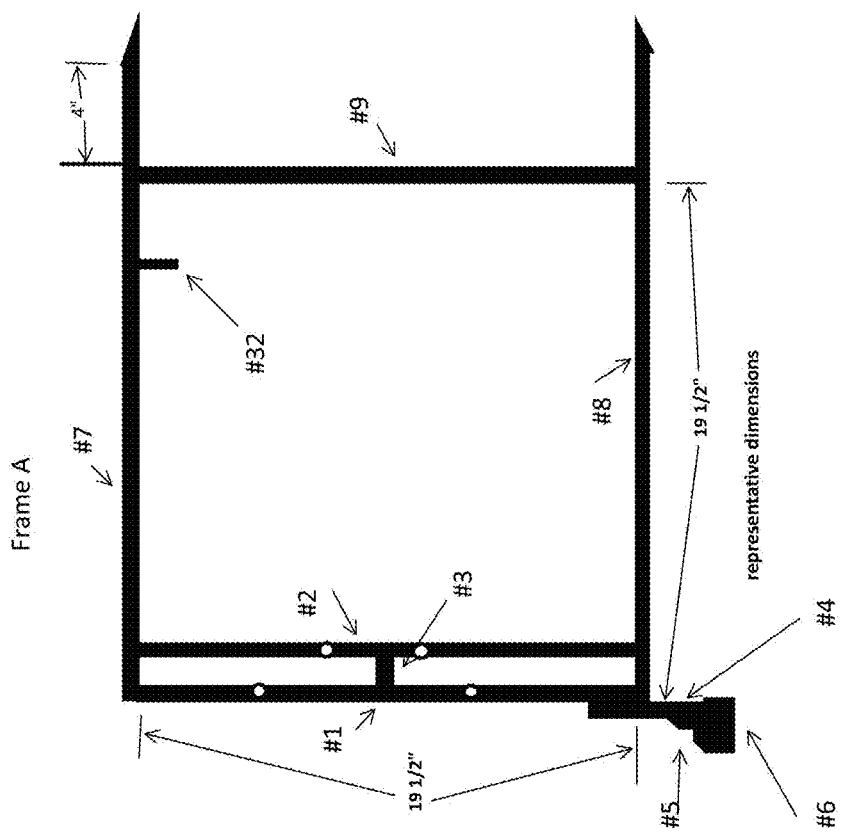
FIG. 3 is Frame A that supports Frame AAA

Mounting frame A, as shown in FIG. 3 is fabricated by welding the frame sections together. Vertical Frame Sections 1, 2 and 9 are parallel when the mounting frame A is welded, and horizontal sections 7 and 8 are also mutually parallel. In this embodiment, all angles are ninety degree right angles in order to correctly support the breakaway frame or arm AAA. The main function of the mounting frame A is to provide a permanent initial frame onto which the breakaway frame can be attached. This provides a means of separation of the extended sign from the bus if an accident should occur.

Frame or arm AAA, as shown in FIG. 7) is the breakaway frame. One configuration of this is made of aluminum tubing to reduce weight. The breakaway arm AAA may however be made of other suitable material. As configured breakaway arm AAA weighs under 6 pounds.

Vertical frame member 16 is made of ¼"×¾" flat aluminum. The length is determined by the vertical inside dimension of frame A. This dimension should be about 1/16" less than the inside dimension of frame A. This is controls the shear affect. Vertical frame member 16 is drilled to receive quarter inch stabilizing pins 27. These holes may be tapered to easier accommodate release if an accident would occur; thus releasing the breakaway frame AAA. These holes are within three inches of the outside corners of vertical frame member 16.

Main vertical frame section 17 is ¾" square aluminum tubing, which has a length determined by the vertical inside dimension of frame A. This should be about 1/16" less than the inside dimension of frame A. Again this determines the shear effect.

Horizontal frame segments 14 and 15 are ¾" square aluminum tubing that are four inches long. Horizontal segments 14 and 15 have quarter inch holes drilled three inches from the outside edge of the frame AAA to accommodate the shear bolts or pins 28.

Inclined tubing members 19 and 20 are fabricated from equal sized ¾" round aluminum tubing about thirty four inches long.

Frame components 18 and 21 are made of solid ⅜" aluminum rod. These are structural members provide additional rigidity, and member 18 is located near the middle distance between frame components 17 and 22.

Outer vertical member 22 is made of ¾" square aluminum tubing and can be eight and one-half inches long. Two quarter inch holes are drilled spaced six inches on center, equal distance from the ends. These holes are for mounting the new STOP sign 31.

The components of this frame AAA are welded together and all openings sealed except for that of outer vertical member 22 which will have wiring installed. Frame components 15 and 20 are welded together such that this subassembly functions as a continuous conduit for a wiring harness 40. All angles should be 90 degree right angles in the square frame, so that frame components 16, 17 and 22 are parallel to each other. This subassembly forming breakaway frame AAA, together with Frame A, constitutes the whole structure for the first embodiment of the Stop Safety Breakaway Arm Extension 100.

Figure 4:
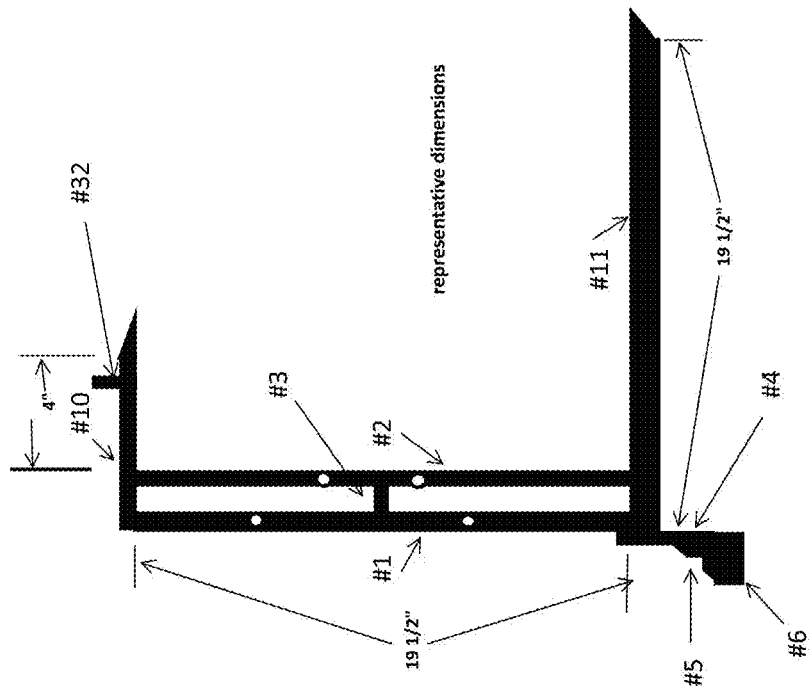
FIG. 4 is Frame B that supports Breakaway Arm option BBB

Mounting Frame B, as shown in FIG. 4 is an initial attachment frame for a second embodiment. One version of mounting frame B is made partially of ¾" and ½" square steel tubing.

Vertical frame members 1 and 2 in Frame B, as shown in FIG. 4, are of the same length, being sufficient to allow un-obscured view of the original, operable STOP sign 51. Frame members 1 and 2 are an adequate size and placement to meet the bus bracket specifications, and the location of these frame members can be modified, if necessary for adaptation to a configuration of a particular STOP sign 51.

Vertical frame member 2 has two additional 9/64" holes drilled on the inside of the frame to accommodate stabilizing pins 27. The holes are oversize relative to the pins 27 allowing for an easier release in case of accident, thus encouraging the breakaway action. These holes should be drilled to exactly match up with the stabilizing pins 27 in frame BBB as shown in FIG. 8.

Horizontal member 3 is of a length to accommodate the correct spacing of the holes in members 1 and 2. Horizontal member 3 is positioned midway on vertical member 1.

Support tubing 4 is made of ¾" square steel tubing at least four inches long and is tapered at one end for cosmetic purposes. As with the first embodiment, tubing 4 supports member 5, which in turn supports ball stud bearing 6 The support member 5 is made of ¾" steel angle iron and is two inches long.

As in the first embodiment, ball stud bearing 6 is made of ½" thick Lexan 1½" by 2", or other suitable bearing material with a ⅜" spherical indentation as shown in FIG. 6 to accept the ⅜" ball stud 34.

Horizontal member 10 is made of ½" square tubing approximately six inches long. It has a tapered end for cosmetic purposes and provides the upper support. Member 10 has a hole drilled into it for the shear member 28, which in this application can comprise a nylon bolt. The distance along the member 10 for the drilling of the hole is such that the resistance obtained when shearing is not less than 40 pounds per shear member 28. In this embodiment the center of the ¼" hole is three inches from the inside of the corner of the frame.

Horizontal lower member 11 is made of ¾" square steel tubing and has a tapered end for cosmetic purposes. Horizontal member 11 is of a length to provide support beyond the original STOP sign 51. A hole in the same position and size as mentioned in member 10 is drilled for the same size shear member 28. This also has an additional stabilizing shear member 5/32" hole drilled sixteen inches" from the part tubing 2. This smaller shear member 28 provides additional rigidity to make sure the supporting member stays beneath the breakaway member that it supports.

This frame B is welded and all openings sealed from the weather. All angles are ninety degree right angles in order to correctly support the next frame BBB. The main function of this piece is to provide a permanent initial frame unto which the breakaway frame can be attached. This provides a means of separation should an accident occur.

Frame BBB, as shown in FIG. 8, is the breakaway frame or arm that is attached to mounting frame B. One configuration of this is made of aluminum tubing to reduce weight. As configured this weighs under 6 pounds.

Vertical frame member 16 is made of 1/4"×3/4" flat aluminum. It is drilled to accept 1/4" stabilizing pins which extend into frame B in the member 2 as shown in FIG. 4. They are tapered to easier accommodate release if an accident would occur; thus releasing the frame. These holes are within 3" of the inside corners of the frame. The length is determined by the vertical inside dimension of frame B. This should be about 1/16" less than the inside dimension of frame A. This is very important as it determines the magnitude of the shear effect.

Upper and lower horizontal members 23 and 24 are of equal 3/4" square aluminum tubing approximately eighteen inches in length, and main vertical tubing member 17 is 3/4" square aluminum tubing approximately 19 7/16" long.

Inclined tubing members 19 and 20 are equally sized 3/4" round aluminum tubing about thirty four inches long.

Frame components 18 and 21 are made of solid 3/8" aluminum rod. These are structural members provide additional rigidity, with member 21 located near the middle distance between vertical members 17 and 22.

Outer vertical tubing 22 is made of 3/4" square aluminum tubing 8 1/2" long. It is drilled with two quarter inch holes spaced six inches on center, equal distance from the ends. These holes are for mounting the new STOP sign 31.

Frame BBB is shown FIG. 8 and its components are welded together and all openings sealed except for that tubing 22 which will have wiring installed. Members 24 and 20 are welded together such that it functions as a continuous conduit for the wiring harness 40. All angles should be ninety degree right angles in the square frame, and that components 16, 17 and 22 are parallel to each other.

Frame C is a mounting frame for a third embodiment of this safety arm. One configuration of frame C is made of 3/4" square steel tubing, and shown in FIG. 5 and the subcomponents of frame C are described as follows.

Frame members 12 and 13 are equal in length about twelve inches long. They have a hole drilled into them for the shear member 28, which currently is a nylon bolt. The distance along the frame member at which the hole is drilled is such that the resistance obtained when shearing is not less than 40 pounds per shear member 28. In this embodiment the center of the hole is four inches from the outside of the corner of the frame. They have tapered ends at least in part for cosmetic purposes.

Tubing members 1 and 2 are identical in this embodiment and they are made of 3/4" square steel tubing and are of a length to provide physical support from the new hinge mechanism 41, shown in FIG. 14, with which mounting frame C is employed. Members 1 and 2 in frame C have holes of an adequate size and placement to conform to the new bus bracket 41, or modifications thereof. There are two additional 9/64" holes drilled on the outside of frame member 2 on the frame C to accommodate the stabilizing pins 27. These are larger than the pins 27 allowing for an easier release in case of accident, thus encouraging the breakaway action. These holes should drilled in exacting placement to match up with the stabilizing pins 27 in Frame CCC, as seen in FIG. 9.

In frame C, spacer 3 is made of 3/4" square steel tubing and of a length to accommodate the correct spacing of the holes as noted in frame members 1 and 2. Spacer 3 is located midway to tubing member 1.

The components forming frame C, as shown in FIG. 5, are welded together, and should be done so that frame members 1 and 2 are parallel as are horizontal frame members 12 and 13. All angles should be ninety degree right angles in order to correctly support the breakaway frame CCC. The main function of mounting frame C is to provide a permanent initial frame onto which the breakaway frame CCC can be attached. This provides a means of separation if an accident should occur.

Figure 9:
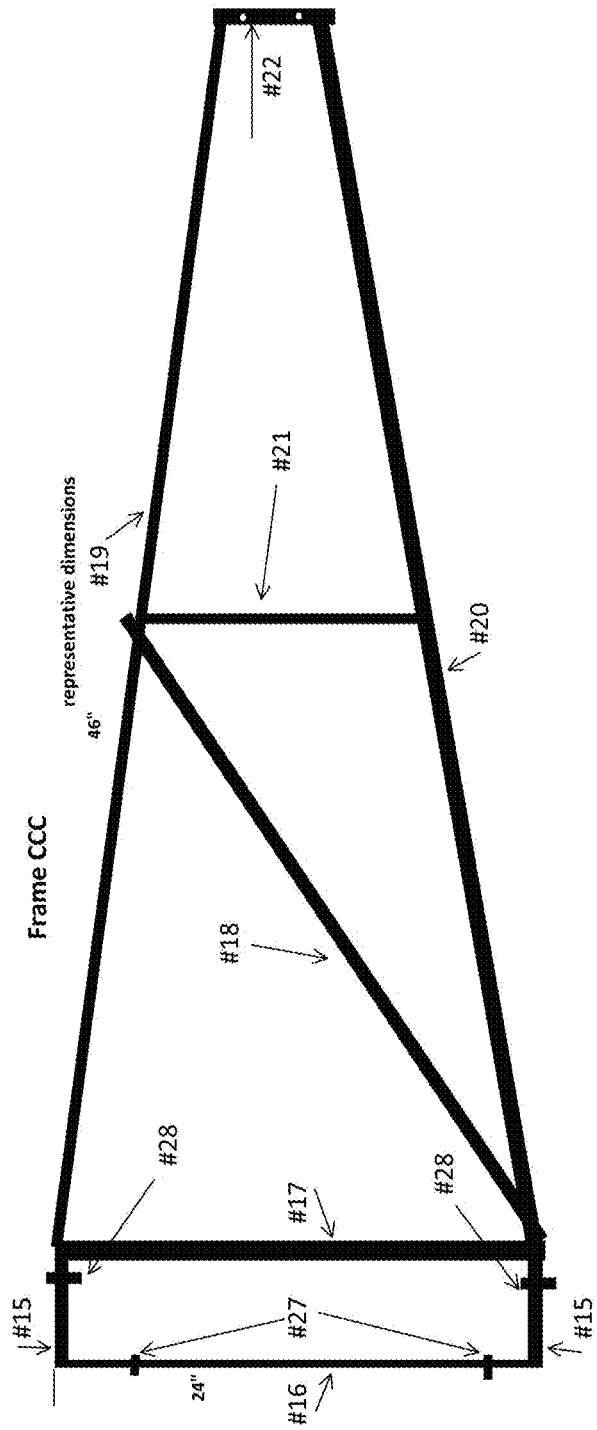
FIG. 9 is Breakaway option CCC Safety Arm without the second STOP sign attached.

Frame CCC, shown in FIG. 9, is a breakaway frame or a breakaway extension arm. One configuration of frame CCC is made of aluminum tubing to reduce weight. As configured, frame CCC would weigh under 7 pounds.

Vertical tubing 16 is made of 1/4"×3/4" flat aluminum. It is drilled to accept 1/4" stabilizing pins 28 which extend into tubing 2 in frame C as shown in FIG. 5. They are tapered to easier accommodate release if an accident would occur; thus releasing the frame. These holes are within three inches of the inside corners of the frame C. The length is determined by the vertical inside dimension of frame C. This should be about 1/16" less than the inside dimension of frame C. This is very important as it determines the magnitude of the shear effect.

Frame members 15 on the top and bottom are equal 3/4" square aluminum tubing approximately six inches in length. Vertical frame member 17 is 3/4" square aluminum tubing approximately 21 1/2"" long.

The inclined members 19 and 20 on the top and bottom of the breakaway frame CCC are equal sized 3/4" round aluminum tubing about forty-six inches long.

Diagonal frame member 18 and vertical frame member 21 are both made of solid 3/8" aluminum rod. These are structural members to provide additional rigidity, placing vertical member 21 near the middle distance between vertical frame members 17 and 22

Frame member 22 is made of 3/4" square aluminum tubing 8 1/2" long. This is drilled with two 1/4" holes spaced six inches on center, equal distance from the ends. These holes are for mounting the new STOP sign 31.

Components of Frame CCC, shown in FIG. 9, are welded together and all openings sealed except for that of member 22 which will have wiring installed. Frame members 15 and 20 are welded together such that it functions as a continuous conduit for the wiring harness 40. All angles in the square frame C should be ninety degree right angles, and the members 16, 17 and 22 be parallel to each other.

Anti-Vibration Support Bracket 25 is shown in FIG. 14B. This bracket 25 is made of 1/4"×10" flat aluminum bent into an U shape with an opening of two inches. The bight of this bracket 25 is secured to the side of the bus and the parallel arms open outward. Bracket 25 thus provides additional support when either of the safety arms 100, 200 or 300 is in a retracted position against the side of the bus to provide additional support while traveling between stops. Bracket 25 will prevent rattling and unnecessary wear on the shear members 28. Two holes are drilled for anchoring with 3/16" solid pop rivets to a bracket 25 on the bus.

Mounting Bracket 26 is shown in FIG. 14C. This is made of 1/4"×12" aluminum bent to allow for clearance of the bus "ribs" extending longitudinally along the side of a bus. This bracket 26 can be customized to the exact sizes necessary to clear these ribs. Bracket 26 has four holes 3/16" for mounting on the bus, two at each end. It also has three sets of holes placed equidistant.

Stabilizing points 27 are aluminum pins and in either of the embodiments are 5/8" long 1/4" in diameter with a forty-five degree point on the end. These pins 27 protrude through either member 16 in Frame AAA as shown in FIG. 7, or member 16 in Frame BBB shown in FIG. 8, or member 16 or Frame CCC shown in FIG. 9. This forms a "hinge point" of the frame in case of an accident, while providing stabilization during normal use. The taper on the ends provide quick release should a bus equipped with either of the safety arms 100, 200 or 300 be involved in an accident caused by a motorist attempting to pass a stopped school bus with all warning signals deployed.

Shear member 28 are made of ¼" nylon bolts two inches in length. While having exceptional tensile strength they allow for shearing at approximately 40 pounds when positioned three inches from the stabilizing points. These shear pins 28 provide the main strength for preventing breakaway as described for Frame AAA, Frame BBB or Frame CCC. Nylon nuts are also to be used along with Locktight or equivalent. Alternative materials can be used. This would depend on the conditions anticipated, as in rough rural gravel roads, or a plastic frame. Any suitable material that provides the desired effect, including spring loaded mechanisms, tapered pins, may be used.

Cover Support Plate 29 is shown in FIG. 13. This plate 29 is made of ⅛"×¾" Aluminum flat stock. Plate 29 is used to secure the new STOP sign 31 to frame member 22 for the embodiments of Frame AAA, Frame BBB or Frame CCC. This is secured by bolts going through all three pieces. This acts like a large washer and provides more stability to the new sign 31.

Lights 30 can be incandescent, LED, or other light sources. Not only are there numerous types, there are equally many shapes and sizes. In the preferred embodiments, an LED light source currently in use with the North Carolina bus system with 10 individual diodes making up the red lens is employed. These provide an extremely bright light that can be flashed. Preferably the brightest light available at the time of manufacture should be employed. The lights 30 were attached with 8-32 stainless bolts of the correct length to hold both the front and rear lights together with stainless nuts and the use of Locktight or equivalent.

STOP sign 31 is a double sided STOP sign with 3M finish per National School Bus specifications, Federal Safety Standard 571-131. This regulation could change, and the appropriate sign should be used to meet the current standards as time goes on.

Support 32, shown for example in FIG. 13, provides support for the retraction device 35. Support 32 is made of ⁵⁄₁₆" square solid steel key stock two inches long. It is threaded ½" on one end for ⁵⁄₁₆"-24 thread. The other end is rounded for ⅝" to ⁵⁄₁₆" diameter for welding into frame A, B or C.

Lower bearing support 33, also shown in FIG. 13. is made of 2" angle iron eight inches long that has been drilled with a ⅜" hole near the center to be at 1¼" from the outside of the angle iron. This support 33 also has four ³⁄₁₆" holes in the opposite side angle for attaching to the bus with ³⁄₁₆" solid pop rivets or other suitable fastener.

A ⅜" ball stud and nut 34 is attached to the support 33. Use of Locktight or equivalent is recommended.

Retraction device 35 is a mechanical means of providing flexible support for the whole frame, including both the mounting frames and the breakaway frame, while also enhancing the retraction of the sign against the side of the bus when traveling. Retraction device 35 is an internal winding spring with cable on the outside of a drum that is weatherproof. This could be accomplished with any similar device providing support as well as encouraging closure to the side of the bus. As configured this is one inch thick and 3⅜" in diameter, model PR325B as manufactured by John Evans Sons. This has a ¾" brass hinge pop riveted to it, which would be mounted to the bus with two ³⁄₁₆" pop rivets.

Cushion stop 36, shown in FIG. 14A prevents the sign and lights from hitting the side of the bus. Cushion stop 36 should be placed on the bus at the midpoint of where the stop sign would engage the bus.

Small Shear Member 37 is shown in FIG. 11. This small shear member 37 is made of an 8-32 nylon bolt, one inch long. This shear member 37 keeps tubing 24 on Frame BBB attached to tubing 11 on Frame B, and in alignment during use to prevent distortion of the aluminum Frame BBB.

Male plug 38 male electrical connector suitable for 3 wire 22 gauge and is part of. the wiring harness 40.

Female receptacle 39 is a female connector suitable for 3 wire 22 gauge and is adhered to the frame of A, B or C. This is included in the wiring harness 40.

Wiring Harness 40 is shown in FIG. 15 and is twenty two gauge, 3 wire cable, preferably UV resistant. This harness 40 connects to the current bus harness with a common splice connector used in automotive for wiring trailer hookups. Liquid insulation and black electrical tape is used to prevent weather damage to the wiring. From there it is connected to a female 3 wire connector (not shown), which in turn plugs into a male 3 wire connector (not shown) and runs inside one of the embodiments Frame AAA, BBB or CCC. This then continues and comes out at frame member 22 of and connects to the lights 30.

Appropriate attachment fasteners are used to hold Frame A or Frame B to the original bus hinge plate (or optional new larger bus hinge plate). In some instances bolts replace the original bolts holding the sign and will now hold the items in this order (starting from the rear), bus hinge plate, original STOP sign, Frame A, B or C.

Sign support bolts in the form of ¼"-20 stainless steel fasteners will hold the new, distally positioned STOP sign 31 onto part 22 of either Frame AAA, BBB or CCC. In each case with the stainless nuts or bolts, Locktight or equivalent is to be used.

Recommended hardware supplies include Locktight or equivelent for threads, ten ³⁄₁₆" aluminum pop rivets, black electrical 600 volt rated tape, three wire automotive low voltage connectors, white lithium grease, epoxy for holding appropriate materials together.

All framing is to be thoroughly cleaned, then primed and painted to the specifications of the purchaser.

A piece of ¾" reflective tape eight inches long is used to cover member 2 in either frame where it covers the original stop sign RED at the point of connecting the initial frame.

The following is a description of the installation of the preferred embodiment shown in FIGS. 3, 4 and 5 of this invention. The majority of the assembly is already done, so the installation should take only 15 to 30 minutes with 2 persons for the first one, and probably only 15 minutes each for additional installations on other buses.

Tools needed include Vise grip pliers, Utility knife, Electrical tester to show 12 volts DC, and two ⁷⁄₁₆" combination wrenches, Start by removing the initial frame and break-off frames from their packaging.

Find the package of hardware and supplies. Open the hardware package and compare to list of items required as noted in parts list shown in FIG. 16.

On the bus, extend the current bus sign arm to the open position.

With stop arm in this position, remove supporting bolts or nuts of current sign, having someone support the current sign and wiring.

Mount the initial or mounting frame A to the existing stop arm hinge using the hardware provided. There are four points of attachment to secure this frame in place. At this time, beginning with the hinge plate and consecutively located are the bus mounted bracket, then the original stop sign, then the new steel frame installed in that order with the nuts to the outside.

At this point, test the electrical wiring of the bus sign by slicing through the insulating cable cover a distance of about 2 inches, being careful not to cut into the individual wire coverings. Do this about midway between the wires leaving the hinge enclosure and the point at which the wiring enters the bus wall, but slightly closer to the bus wall then the sign hinge. Attach one of the snap-on splice connectors to each of the 3 wires. Determine which one of these is the ground wire. The positive sides should show a reading, the ground one will not.

Now connect the wiring harness 40 to this with the bare wire being the ground, and the Red and Black wires connecting to the other two. Make sure these flash in an alternating pattern to the original stop sign lights, or other configuration as specified by the purchaser.

The lower bearing assembly consisting of a bracket 33 and ball stud 34 is attached to the bus with four ³⁄₁₆" solid aluminum pop rivets or other suitable fastener. This is attached after the initial frame A or B is mounted such that the alignment to the existing bearings is exact. This bearing should have a slight upward thrust and shimmed from the side of the bus if necessary.

The retraction device should be pre-tensioned to approximately 8 lbs. pull when closed, and attached to the bus approximately 8" to the rear of the bus from the hinge point of the arm, at nearly the same level as the device itself.

Place the Aluminum Safety frame AAA, BBB or CCC as appropriate into the steel frame with the STOP wording on the sign facing up for correct reading.

Hold the extension frame in very tight to the attached frame, insert the shear member into the upper shear hole first and then another shear member into the lower hole. Put Locktight or equivalent on the threads of these nylon (or other) bolts and attach nuts onto each bolt and tighten ½ turn past finger tight.

If installing mounting frame B, put Locktight or equivalent on the threads of the small shear member and insert into place. Note that this does not go all the way through, and has no nut, it is held in by the Locktight or equivalent.

Insert male electrical plug into female socket on initial permanent frame A, B or C. This will not "click in" as you would expect, as it is supposed to disengage if hit by a vehicle.

Next test to see if the lights are working properly.

Use liquid electrical wire insulation and black electrical tape to seal wire connections at bus from the elements. Use white lithium grease on the outside of the plug in connection between the frames as a weather sealant.

The embodiments depicted herein are representative examples of this invention. One of ordinary skill in the art would recognize that modifications would be apparent without departing from the scope of this invention.

We claim:

1. A deployable sign assembly for use on a school bus, the sign assembly being extendable and retractable from an traffic lane adjacent the school bus when stopped, to protect children entering or leaving the school bus, the sign assembly comprising:
   a barrier having a fixed, constant length between the first end and a second end with the first end of the barrier being pivotally mountable for the barrier to swing on an arc relative to the school bus between a barrier retracted position, in which the barrier extends parallel along one side of the school bus, extending between front and rear of the school bus to which the barrier is mountable, and a barrier extended position during deployment of the sign assembly, the barrier being extendable into the traffic lane adjacent the school bus when in the barrier extended position in which the barrier extends transverse to the barrier retracted position and transverse to the one side of the school bus to which the barrier is mountable by a distance equal to the fixed length of the barrier and sufficient to obstruct motorists trying to pass the stopped school bus in the adjacent lane when the school bus is stopped and to protect children crossing the traffic lane adjacent the school bus when stopped, wherein the barrier is mountable on the school bus at a height at least equal to the eye line of a motorist in a passenger automobile so as to be readily visible to any approaching motorist and is releasable if struck by a vehicle passing the stopped school bus in the adjacent lane, and wherein the barrier is connected to the mounting member only by multiple shear pins so that the barrier is detached from the mounting member if struck by the vehicle passing the stopped school bus but the shear pins otherwise retain connection of the barrier to the mounting member during movement of the mounting member and the barrier between the barrier retracted position and the barrier extended position.

2. The deployable sign assembly of claim 1 wherein the barrier is connected to a mounting member that is attached to the school bus for movement, the barrier being releasable from the mounting member when struck by the vehicle passing the stopped school bus in the adjacent lane.

3. The deployable sign assembly of claim 1 wherein the mounting member and the barrier are retrofitable on the bus and an operable stop sign on the bus.

4. The deployable sign assembly of claim 1 wherein the shear pins otherwise retain connection of the barrier to the mounting member during movement of the mounting member and the barrier between the barrier retracted position and the barrier extended position.

5. A safety arm for use on a school bus to prevent motorists from passing the school bus when stopped and to protect children crossing a road to board or exit the school bus, the safety arm comprising:
   a first frame mountable adjacent a side of the school bus, so that the first frame is pivotable between a retracted position, extending parallel along a side of the school bus, and an extended position in which the first frame extends transverse to the retracted position and transverse to the side of the school bus; and
   a second frame attachable to the first frame and longer than the first frame so that the second frame extends laterally beyond the first frame with a distal stop sign mounted on a remote end of the second frame; wherein
   the first frame and the second frame are attachable to each other as a body of fixed and constant length to swing in unison along an arc between the retracted and extended positions, the second frame being releasable from the first frame by an impact only striking the second frame, so that when the second frame is struck by a vehicle, the first frame remains mounted on the side of the school bus and the second frame is released from the first frame, wherein the first frame is connected to the second frame only by at least one frangible member so that the second frame is detached from the first frame if struck by the vehicle passing the school bus when stopped but the at least one frangible member otherwise retains connection of the second frame to the first frame during movement of the first frame and the second frame between the retracted position and the extended position.

6. The safety arm of claim 5 wherein the first frame is engagable with an operable, proximal stop sign pivotal on the side of the school bus so that the first frame and the second frame are movable between a retracted position and an extended position in response to movement of the operable, proximal stop sign, wherein the distal stop sign is spaced beyond the operable, proximal stop sign to be in front of the vehicle approaching the school bus, and wherein both the proximal stop sign and the distal stop sign are octagonal stop signs.

7. The safety arm of claim 6 wherein electrical indicators are mounted on both the operable, proximal stop sign and the distal stop sign.

8. The safety arm of claim 7 wherein the electrical indicators on the operable, proximal stop sign and the distal stop sign are connected by a wiring harness.

9. The safety arm of claim 6 wherein the first frame is securable relative to the operable, proximal stop sign.

10. The safety arm of claim 6 wherein the first frame is retrofitable to the bus without removing the operable, proximal stop sign.

11. A safety breakaway arm extension for use with an operable octagonal stop sign mounted on a vehicle, the arm extension comprising:
a first arm member securable on the operable octagonal stop sign for movement with and in response to movement of the operable octagonal stop sign as the operable octagonal stop sign moves between an operable stop sign retracted position and an operable stop sign extended position; and
a second arm member attachable to the first arm member, but not to the operable octagonal stop sign, the second arm having a length greater than the length of the first arm member and greater than a maximum dimension of the operable octagonal stop sign, the first and second arm members being movable, without relative movement therebetween, between an arm extension retracted position and an arm extended position in unison with and in response to movement of the operable octagonal stop sign between the operable stop sign retracted position and the operable stop sign extended position with the second arm member extending beyond the operable octagonal stop sign in the arm extension extended position and with the second arm member being positioned parallel along one side of the vehicle in the arm extension retracted position;
wherein the second arm member has a length sufficient to extend, transversely relative to the one side of the vehicle, into a traffic lane adjacent the vehicle and the second arm is releasable from the first arm member by an impact on the second arm member, not striking the first arm member or the operable octagonal stop sign, and
wherein the first arm member is connected to the second arm member only by multiple frangible shear pins so that the second arm member is detached from the first arm member if struck by the vehicle passing the school bus when stopped but the shear pins otherwise retain connection of the second frame to the first frame during movement of the first arm member and the second arm member between the retracted position and the extended position.

12. The safety breakaway arm extension of claim 11 wherein the first arm member comprises a first frame and the second arm member comprises a second frame.

13. The safety breakaway arm extension of claim 11 wherein the first arm member comprises a first frame that will extend at least partially around the operable octagonal stop sign when secured thereto.

14. The safety breakaway arm extension of claim 11 wherein the second arm member comprises a second frame that will extend beyond the operable octagonal stop sign when attached to the first arm member.

15. The safety breakaway arm extension of claim 11 wherein an electrical indicator is mounted on the second arm member, the electrical indicator being detachably wired to a source of electricity on the vehicle.

16. The safety breakaway arm extension of claim 11 wherein the first arm is retrofitable to the bus without removing the operable octagonal stop sign.

17. A safety arm for use on a vehicle, which has a pivoting octagonal stop sign swinging outward from a first position parallel with one side of the vehicle, extending between front and rear of the vehicle, to a second position extending transverse to the one side, the safety arm comprising:
an elongate frame attachable to the pivoting octagonal stop sign for movement in unison with the pivoting, octagonal stop sign only along an arc from the first position parallel to the one side of the vehicle to the second position transverse of the first position, the elongate frame having a length greater than the pivoting octagonal stop sign and sufficient to extend into an adjacent lane of traffic so as to be more readily visible from in front and behind the vehicle when in the second position, the elongate frame being retractable with the pivoting octagonal stop sign to extend parallel to the one side of the vehicle when the pivoting, octagonal stop sign is in the first position,
wherein the elongate frame member comprises an open frame formed by a plurality of interconnected members.

18. The safety arm of claim 17 wherein elongate frame comprises two frame members, one frame member breaking away from the other frame member when struck by a second vehicle in the adjacent lane.

19. A school bus equipped with an octagonal stop sign swinging outward from a first position parallel with one side of the school bus parallel with an adjacent traffic lane, to a second position extending transverse to the one side and to the adjacent traffic lane, the school bus also including a safety arm attached to the octagonal stop sign to move along an arc with the octagonal stop sign during movement of the octagonal stop sign from the first position to the second position, the safety arm having a length greater than the octagonal stop sign and sufficient to extend into and at least partially across an adjacent lane of traffic so as to be more readily visible, when in the second position, to motorists in the adjacent lane of traffic and to motorists following the school bus, the safety arm being retractable with the octagonal stop sign to extend parallel to the one side of the school bus when the pivoting, octagonal stop sign is in the first position, the safety arm and the octagonal stop sign moving together.

\* \* \* \* \*